Patented Mar. 30, 1943

2,315,107

UNITED STATES PATENT OFFICE 2,315,107

CATALYTIC DEHYDROGENATION

James Chickinoff and Robert M. Roberts, Berkeley, and James Burgin, Oakland, Calif., assignors to Shell Development Company, San Francisco, Calif., a corporation of Delaware No Drawing. Application April 29, 1941, Serial No. 390,942

7 Claims. (Cl. 260—683.3)

This invention relates to a new and improved method for effecting the catalytic dehydrogenation of hydrocarbon vapors having from two to five carbon atoms in the molecule.

The catalytic dehydrogenation of hydrocarbons having from two to five carbon atoms is well known and of considerable importance. The conventional method for executing these reactions is to pass preheated vapors of the hydrocarbon to be dehydrogenated, sometimes admixed with diluent gases, in contact with a suitable dehydrogenation catalyst at a temperature, pressure and space velocity conducive to the desired dehydrogenation reaction. This general method, although in quite wide use, has certain inherent disadvantages which are impossible to completely eliminate and can only be minimized by careful engineering. The most difficult problem encountered in the process is in supplying the necessary heat to the reaction zone. The dehydrogenation of these hydrocarbons, it is known, is highly endothermic. As a consequence, unless additional heat is supplied to the reaction zone, the vapors to be dehydrogenated are quickly cooled by the reaction before satisfactory conversions are obtained. Sufficient heat usually cannot be introduced with the reactant vapors by further preheating them since under such circumstances a substantial part of the reactant vapors is contacted with the catalyst at higher than optimum temperatures and degradation, carbon deposition, etc. result. The only practical means so far found to supply the necessary heat is through the reactor walls. Due to the poor heat conductivity of the catalyst, this requires the use of long tubes of small cross section, elaborate heating furnaces, etc. Furthermore, the method at its best is not very efficient inasmuch as cracking, etc. due to higher tube wall temperatures are generally encountered.

The present invention provides an improved method whereby these difficulties may be substantially overcome. We have found that the dehydrogenation of hydrocarbons having from two to five carbon atoms may be effected without the usual difficulties by employing certain catalysts in an adiabatic converter and supplying the necessary heat to maintain a suitable temperature gradient by means of a specific heat-carrying gas, namely hydrogen sulfide.

The use of inert diluents in catalytic vapor phase processes is known. Thus, it has been frequently proposed to employ hydrogen, nitrogen, carbon dioxide and steam as inert diluents. In most cases, however, inert diluents are not used. Nitrogen and carbon dioxide rarely exert any beneficial effect as diluents. Steam is beneficial as an inert diluent in certain dehydrogenation reactions but is not applicable for dehydrogenation processes of the type here in question due to the fact that the most suitable dehydrogenation catalysts are ineffective in the presence of steam. Hydrogen is sometimes used as an inert diluent in catalytic dehydrogenation processes, and its use is especially advantageous when dehydrogenating higher easily cracked hydrocarbons. Hydrogen, however, is not, strictly speaking, an inert diluent since it displaces the reaction equilibrium and is not generally recommended in the dehydrogenation of lower boiling hydrocarbons.

The use of hydrogen sulfide in certain dehydrogenation processes is known and frequently recommended. In such cases, however, it is not used in substantial quantities as an inert diluent but in small quantities for the specific purpose of retaining the activity of sulfide catalysts. The known use of hydrogen sulfide is therefore practically confined to dehydrogenation processes employing molybdenum sulfide and similar sulfide catalysts and is not generally used in the dehydrogenation of gaseous paraffins.

The use of gaseous heat carriers in catalytic dehydrogenation has also been suggested. Generally, however, in view of the characters of the available diluent gases hitherto suggested, it has been entirely impractical to convey more than a small fraction of the total endothermic heat to the reaction zone by this method. Thus, although the diluent gas, when this is used, often acts to a certain extent as a heat carrier, it has been hitherto necessary to supply the main part of the heat to the reaction zone by conventional means such as by direct heating of the reactor walls. The reason for this is that the recommended diluent gases, when used in quantities sufficient to supply any appreciable proportion of the heat of reaction, cause a prohibitive loss in conversion and production capacity. Of the hitherto recommended diluent gases which may act as heat carriers, hydrogen is by far the best. Steam, as mentioned above, although it is an excellent heat carrier gas, is entirely inapplicable in dehydrogenation processes of the type in question. As will be more fully pointed out below, hydrogen sulfide when properly applied is an excellent diluent heat carrier gas and is much superior to hydrogen and the other hither recommended diluent gases.

The process of our invention is adapted for the catalytic dehydrogenation of hydrocarbons having from two to five carbon atoms in the molecule.

Hydrocarbons having six or more carbon atoms in the molecule tend to undergo considerable sulfurization under the conditions required for the dehydrogenation. The hydrocarbon to be dehydrogenated may be either saturated or unsaturated, and of the open chain or cyclic type. Thus, for example, the process may be applied for the catalytic dehydrogenation of such compounds as ethane, propane, butane, isobutane, pentane and isopentane to produce the corresponding olefines. It may be also applied for the catalytic dehydrogenation of ethylene, propylene, butylene, isobutylene, the amylenes and cyclopentane to produce the corresponding diolefines and/or acetylenes. Preferred applications of the process are, for example, in the catalytic dehydrogenation of ethane, propane and isobutane to the corresponding olefines.

Although these hydrocarbons may be catalytically dehydrogenated with a large variety of dehydrogenation catalysts, many of these catalysts are not particularly adapted for use in the present process. The catalysts most advantageously employed in the process are those comprising alumina and/or a dehydrogenating compound of a metal of the first transition series of the elements. The term "first transition series," as used herein, comprises the elements Sc, Ti, V, Cr, Mn, Fe, Co, Ni, Cu and Zn. Although Cu and Zn are not, strictly speaking, transition elements, it is well known that there is a gradation of properties through Co, Ni and Cu to Zn and that these elements represent the natural conclusion of the series. They are therefore often considered with the transition elements of the first series. The preferred catalysts comprise alumina and a dehydrogenating compound of at least one of the elements of the eighth group, namely Fe, Ni and Co. These may, if desired, also contain dehydrogenating compounds of one or more other metals of the first transition series, such as chromium. These metals may be in the form of various compounds but are preferably in the form of their oxides. If desired, the catalyst may contain one or more promoter or stabilizer substances such as Pt, Pd, oxides of Ce, K, Bi, Be, Si, Zr, and the like. The various catalysts may be used in any conventional form such as fragments of gels or pelleted pieces, or the like. The dehydrogenating compounds of the metals of the first transition series are preferably employed in the surface of a suitable supporting substance such, for instance, as activated alumina, activated bauxite, activated carbon, activated magnesia, activated clay, silica gel, alumina gel, and the like, which may or may not exert a catalytic effect.

The conditions of temperature and space velocity required for the catalytic dehydrogenation of the above hydrocarbons with catalysts of the above general type are well known. The present process does not differ appreciably from the conventional methods in these respects. Although somewhat higher and lower pressures may be employed, the process is preferably operated at pressures at or near atmospheric, for example, from about 0.5 to 5 atmospheres absolute.

In the catalytic dehydrogenation of the above specified hydrocarbons with the above specified catalysts, we have found that hydrogen sulfide is not only a practical heat carrier gas but is much superior to all of the other inert gaseous mediums hitherto recommended for this purpose. This will be apparent from the following remarks relative to the use of various specific inert diluents as heat carriers in a typical dehydrogenation reaction, namely, the dehydrogenation of isobutane to isobutylene at temperatures of about 600° C.

Hydrocarbon

It is known that certain hydrocarbons such as benzene and methane are thermally quite stable and have high specific heats. It might be expected therefore that such a hydrocarbon would be a suitable heat carrier for dehydrogenation processes. It is found, however, that under the dehydrogenation conditions, catalysts of the present type cause a certain amount of decomposition of such hydrocarbons and that, although the initial conversions are satisfactory, the catalyst activity declines at a much more rapid rate than normally.

Carbon dioxide

Carbon dioxide would appear to be a promising heat carrier gas in view of its relatively high specific heat, low cost and the ease with which it may be removed from the reaction product. It is frequently suggested as a suitable inert diluent. It is found, however, that the use of carbon dioxide in substantial proportions materially decreases the catalyst activity. This is shown, for instance, by the following experiments:

In one experiment the isobutane was dehydrogenated at 600° C., the heat of reaction being added through the reactor walls in the conventional manner. In other experiments the heat was added by the use of a 4:1 ratio of preheated carbon dioxide. The isobutane space velocity was 6.6 per minute. The following results were obtained:

|  | $CO_2$ diluent | No diluent |
|---|---|---|
| Maximum conversion | 15–18 | 36.6 |
| Conversion, 1.5 hours | 13–14 | 31.3 |
| Conversion, 3 hours | 11–13 | 28.2 |
| Ratio of isobutane to total olefines | 0.45–0.52 | 0.70 |

It is seen that the use of carbon dioxide as a heat carrier gas gives conversions barely half as high as normal. It is known that dehydrogenation catalysts of this type are very sensitive to water vapors and it is believed that the low conversions obtained using carbon dioxide as a heat carrier gas are due to the poisoning of the catalyst with small amounts of water formed by the reaction of liberated hydrogen with the carbon dioxide.

Nitrogen

Nitrogen when used as a heat carrier gas is quite satisfactory as far as the catalyst activity is concerned. Nitrogen, however, has a distinct disadvantage which makes its use commercially impractical. It is very difficult to separate the nitrogen diluent from the hydrogen formed in the reaction.

Hydrogen

Hydrogen has been frequently suggested as an inert diluent because it represents the simplest dilution system and involves only the recirculation of the hydrogen resulting from the reaction itself. Hydrogen, however, has certain disadvantages which make its use as an efficient heat carrier less desirable. In the first place, hydrogen has a relatively low specific heat; therefore, in order to convey substantial quantities of heat to the reaction zone, larger volumes are required. Taking the specific heat of hydrogen and isobutane at 500° C. as 13.2 and 91 B. T. U./lb. mol, respectively, the temperature of a mixture of 4 mols of hydrogen and 1 mol of isobutane would have to drop 52° C. in order to supply the 13,500 B. T. U. required for the reaction of isobutane to isobutylene (25% conversion). The temperature drop for a mixture of 8 mols of hydrogen and 1 mol of isobutane would be 38° C. In the second place, hydrogen when used in large quantities has an unfavorable effect upon the equilibrium in the dehydrogenation reaction. The effect of 8 volumes of hydrogen with 1 volume on the equilibrium conversion of isobutane to isobutylene at 600° C. is a reduction from about 79% to about 55%. We have found, moreover, that when hydrogen is used as a diluent heat carrier in the dehydrogenation of the hydrocarbons specified above, there is yet another disadvantage which, as far as we are aware, has not been recognized by those who have hitherto suggested the use of hydrogen in such processes. It is known that the presence of substantial quantities of hydrogen generally tends to suppress decomposition reaction and the formation of carbon and in most catalytic processes tends to thereby decrease the rate of decline of catalyst activity. When hydrogen is employed in substantial quantities in dehydrogenation processes of the type in question, it is also observed that little or no carbon is formed. In spite of this, however, the catalysts when used with substantial quantities of hydrogen show a decline in activity quite out of proportion to the amount of carbon deposited. This action of the hydrogen diluent becomes particularly noticeable upon successive regenerations of the catalyst. Thus, for example, in a series of 22 on-stream and regeneration cycles using a 4:1 ratio of hydrogen heat carrier, the 6-hour average conversion of 29% in initial run decreases to 10% after 8 cycles. That the activity of the catalyst is impaired only in the presence of added diluent hydrogen is indicated by the fact that high conversions may again be obtained in the following cycles if no diluent is used. Comparative experiments have shown that this effect is not obtained by pretreating the catalyst with hydrogen. The decline in activity appears only when the feed is diluted with hydrogen during dehydrogenation. It is apparent that hydrogen has some influence upon the catalyst which, while not impairing the dehydrogenation capacity under the usual operating conditions, hinders the dehydrogenation when it is added in substantial quantities as a diluent. A plausible explanation of this phenomenon is that there is a selective adsorption of hydrogen upon the active catalyst surface at the elevated temperatures used, thus preventing the hydrocarbon from coming into effective contact. The sensitivity of the catalyst to this effect of hydrogen has been found to increase upon repeated regeneration.

*Hydrogen sulfide*

Hydrogen sulfide, we have found, is a very suitable diluent and heat carrier. It has a relatively high specific heat compared to hydrogen and can, therefore, be used in smaller volumes. It is thermally stable. It can be readily removed from the reaction products by simple known processes.

When isobutane was dehydrogenated at 610° C. (space velocity of 6.6 per minute with respect to isobutane) with an iron-alumina catalyst containing about 6% iron and with a 1:1 mol ratio of preheated hydrogen sulfide, maximum conversions of 67% and 6-hour average conversions of 55% were obtained. The ratio of isobutylene to total olefines was 0.87 and the yield of isobutylene based on the feed reacted was 79%. The maximum conversion obtained is quite close to that calculated for the equilibrium conversion. Despite the high sulfur content of the feed, only negligible amounts of organic sulfur compounds were formed. Propane and ethane were also successfully dehydrogenated over a similar catalyst using hydrogen sulfide to convey the total endothermic heat of reaction to the reaction zone. Thus, using a 1:1 mol ratio of hydrogen sulfide, propane was dehydrogenated at 650° C. to obtain a maximum conversion to propylene of 50% and a 6-hour average conversion of 26%. The corresponding figures for the dehydrogenation of ethane at 700° C. were 40% (equilibrium value, 41% at this temperature) and 25% to ethylene, respectively.

In the process of our invention the dehydrogenation of the above-specified hydrocarbons is effected with catalysts of the specified type in an essentially adiabatic reaction zone, and a quantity of heat sufficient to supply the endothermic dehydrogenation with an allowable temperature gradient is supplied by suitable quantities of preheated hydrogen sulfide. The hydrogen sulfide is preheated to a temperature above the desired reaction temperature and passed through the reaction zone in direct contact with the hydrocarbon vapors being dehydrogenated. In a preferred embodiment of the process the hydrogen sulfide is separated from the hydrocarbon reaction product and recycled.

The amount of hydrogen sulfide employed is always sufficient to maintain a suitable and allowable temperature gradient in the reaction zone. Suitable temperature gradients vary somewhat with the particular hydrocarbon treated and the particular catalyst used. In most cases satisfactory conversions require a temperature gradient of not more than about 100° C. In general, however, somewhat smaller temperature gradients, for example, 20° C. to 75° C., are preferably maintained. Although smaller temperature gradients, such as 5° C. to 20° C., are more desirable as far as the efficiency of the catalytic conversions is concerned, their maintenance involves the use of larger quantities of heat carrier gas. The amount of hydrogen sulfide required to maintain the desired temperature gradient depends upon the amount of dehydrogenation taking place and, hence, upon the feed rate of the hydrocarbon to be dehydrogenated. When using hydrogen sulfide as the heat carrier gas, according to the present process, suitable temperature gradients may be maintained with very good conversions with ratios of hydrogen sulfide to hydrocarbon feed as low as 1:1. In many cases, however, somewhat larger ratios, for instance, ratios from 2:1 to 6:1, give more advantageous results.

The preheated hydrogen sulfide may be introduced into the reaction zone by a separate inlet or, if desired, it may be introduced into the reaction zone mixed with the hydrocarbon feed. In many cases it is also advantageous to mix the hydrogen sulfide with the hydrocarbon feed prior to the preheating step. When operating in this way a single preheating unit may suffice.

After passing through the reaction zone the product is treated by conventional methods to separately recover the hydrocarbon and the hydrogen sulfide. Any of the conventional desulfurizing methods yielding hydrogen sulfide, such as the Phosphate, Alkazid, Phenolate and Girdler processes, may be used. In a preferred embodiment of the invention the reaction product is cooled to condense the hydrocarbon, and the liquid hydrocarbon fraction and gaseous fraction are separately treated. Although the recycled gas, according to the present process, is essentially hydrogen sulfide, the separation of the hydrogen formed in the reaction does not have to be complete. Minor amounts of hydrogen or other inert gases in the recycled hydrogen sulfide are not usually detrimental. If desired, the hydrogen may be continuously removed from the hydrogen sulfide by partial combustion of the gas mixture and the heat of this combustion can be utilized in the preheated hydrogen sulfide.

While when operating the process of the invention as a self-contained or individual process the hydrogen sulfide is preferably recycled, the process may also be advantageously combined with various processes wherein hydrogen sulfide is recovered from gases by any of the above-mentioned methods. When combined with such processes the recovered hydrogen sulfide may be employed in the present process with no material consumption and returned to the hydrogen sulfide recovery system. Not only is the cost of separating and recycling hydrogen sulfide eliminated in such cases but the hydrogen formed in the reaction may be advantageously used to enrich the desulfurized gases from the desulfurization unit.

The process of the invention may be employed in apparatus of the conventional type. As pointed out above, however, in the present process it is unnecessary to provide means such as a furnace or the like for adding heat to the reaction zone through the reactor walls. Consequently, less costly reaction converters of simpler design may be employed. The reactors employed in the present process may, if desired, have a large cross section; this allows much greater production capacities to be obtained from a single converter. In order to avoid excessive loss of heat through radiation, etc., the reactor is preferably well insulated. In some cases where quite high temperatures are employed in the reactor and the tendency to lose heat by radiation, etc. is great, it may be desirable to surround the reaction chamber with a hot fluid medium to avoid such losses.

In many cases where gaseous hydrocarbons are treated at the relatively high temperatures required for dehydrogenation, and especially when the reaction takes place in a reactor having iron or steel walls, considerable difficulty is encountered with the formation of large amounts of carbon caused apparently by the catalytic action of the reactor walls. Since in the process of the present invention it is not necessary to add heat through the reactor walls, the reaction converter, if desired, may be lined with silicon, gunnite, or a similar non-carbon forming material without incurring the usual disadvantages caused by the poor heat conductivity of such materials. While converters lined with non-carbon forming materials may be advantageously employed in the present process, their use is not, however, necessary except in such cases where the catalyst is easily poisoned by iron. The considerable concentrations of hydrogen sulfide in the reaction zone in the process of the invention inhibit the catalytic effect of ferrous reactor walls and eliminate completely the difficulty due to carbon formation. A certain amount of transfer of iron from the reactor walls to the catalyst is, however, sometimes noticed. Since iron is often a normal constituent of the catalyst employed in the process, however, this is usually of no consequence.

We claim as our invention:

1. A process for the catalytic dehydrogenation of butane which comprises preheating butane, passing the preheated butane vapors through an essentially unheated reaction zone in contact with a dehydrogenation catalyst containing a dehydrogenating compound of a metal of the first transition series of the elements under dehydrogenation conditions, preheating hydrogen sulfide vapors to a temperature in excess of the desired reaction temperature, simultaneously passing said preheated vapors of hydrogen sulfide in mol excess with respect to the butane through the reaction zone, separating butylene from hydrogen sulfide in the product, and recycling hydrogen sulfide through the reaction zone.

2. A process for the catalytic dehydrogenation of a hydrocarbon having from two to five carbon atoms which comprises preheating the hydrocarbon to be dehydrogenated, passing the preheated hydrocarbon vapors through an essentially unheated reaction zone in contact with a dehydrogenation catalyst containing a dehydrogenating compound of a metal of the first transition series of the elements under dehydrogenation conditions, preheating hydrogen sulfide vapors to a temperature in excess of the desired reaction temperature, simultaneously passing said preheated vapors of hydrogen sulfide in mol excess with respect to the hydrocarbon through said reaction zone, separating the hydrocarbon from hydrogen sulfide in the product, and recycling hydrogen sulfide through the reaction zone.

3. In a process for the catalytic dehydrogenation of butane with an iron oxide-alumina dehydrogenation catalyst, the steps of effecting the dehydrogenation in an essentially adiabatic reaction zone and maintaining a temperature gradient not greater than about 100° C. in said reaction zone by passing a molecular excess of preheated vapors of hydrogen sulfide therethrough in admixture with the vapors of the hydrocarbon to be dehydrogenated, said hydrogen sulfide vapors being preheated to a temperature in excess of the desired reaction temperature.

4. In a process for the catalytic dehydrogenation of propane with an iron oxide-alumina dehydrogenation catalyst, the steps of effecting the dehydrogenation in an essentially adiabatic reaction zone and maintaining a temperature gradient not greater than about 100° C. in said reaction zone by passing a molecular excess of preheated vapors of hydrogen sulfide therethrough in admixture with the vapors of the hydrocarbon to be dehydrogenated, said hydrogen sulfide vapors being preheated to a temperature in excess of the desired reaction temperature.

5. In a process for the catalytic dehydrogenation of ethane with an iron oxide-alumina dehydrogenation catalyst, the steps of effecting the dehydrogenation in an essentially adiabatic reaction zone and maintaining a temperature gradient not greater than about 100° C. in said reaction zone by passing a molecular excess of preheated vapors of hydrogen sulfide therethrough in admixture with the vapors of the hydrocarbon to be dehydrogenated, said hydrogen sulfide vapors being preheated to a temperature in excess of the desired reaction temperature.

6. In a process for the catalytic dehydrogenation of hydrocarbon vapors containing from two to five carbon atoms with an iron oxide-alumina dehydrogenation catalyst, the step of effecting the dehydrogenation in an essentially adiabatic reaction zone and maintaining a temperature gradient not greater than about 100° C. in said reaction zone by passing a molecular excess of preheated vapors of hydrogen sulfide therethrough in admixture with the vapors of the hydrocarbon to be dehydrogenated, said hydrogen sulfide vapors being preheated to a temperature in excess of the desired reaction temperature.

7. In a process for the catalytic dehydrogenation of hydrocarbon vapors containing from two to five carbon atoms with a dehydrogenation catalyst containing a dehydrogenating compound of a metal of the first transition series of the elements, the steps of effecting the dehydrogenation in an essentially adiabatic reaction zone and maintaining a temperature gradient not greater than about 100° C. in said reaction zone by passing a molecular excess of preheated vapors of hydrogen sulfide therethrough in admixture with the vapors of the hydrocarbon to be dehydrogenated, said hydrogen sulfide vapors being preheated to a temperature in excess of the desired reaction temperature.

JAMES CHICKINOFF.
ROBERT M. ROBERTS.
JAMES BURGIN.